US007509628B2

(12) United States Patent
Hilerio et al.

(10) Patent No.: US 7,509,628 B2
(45) Date of Patent: Mar. 24, 2009

(54) EXTENSIBILITY FRAMEWORK FOR DEVELOPING FRONT OFFICE (CRM) WORKFLOW AUTOMATION COMPONENTS

(75) Inventors: Israel Hilerio, Kenmore, WA (US); Xinguang Chen, Redmond, WA (US); Mary Anne Coles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 11/023,771

(22) Filed: Dec. 23, 2004

(65) Prior Publication Data

US 2006/0143591 A1  Jun. 29, 2006

(51) Int. Cl.
*G06F 9/44* (2006.01)

(52) U.S. Cl. .................. 717/103; 717/101; 717/102

(58) Field of Classification Search ................ 717/103, 717/101, 102; 705/1, 8, 9; 709/220
See application file for complete search history.

(56) References Cited

U.S. PATENT DOCUMENTS

| | | | |
|---|---|---|---|
| 6,633,878 B1 * | 10/2003 | Underwood ................ | 707/100 |
| 6,901,595 B2 * | 5/2005 | Mukundan et al. ......... | 719/316 |
| 6,907,451 B1 * | 6/2005 | Mukundan et al. ......... | 709/204 |
| 6,954,758 B1 * | 10/2005 | O'Flaherty ................ | 707/102 |
| 6,957,199 B1 * | 10/2005 | Fisher ....................... | 705/78 |
| 7,136,865 B1 * | 11/2006 | Ra et al. .................... | 707/102 |
| 7,146,617 B2 * | 12/2006 | Mukundan et al. ......... | 719/330 |
| 7,174,514 B2 * | 2/2007 | Subramaniam et al. .... | 715/749 |
| 7,188,158 B1 * | 3/2007 | Stanton et al. ............. | 709/220 |
| 7,203,948 B2 * | 4/2007 | Mukundan et al. ......... | 719/330 |
| 7,221,377 B1 * | 5/2007 | Okita et al. ................ | 345/629 |
| 7,249,048 B1 * | 7/2007 | O'Flaherty ................ | 705/10 |

OTHER PUBLICATIONS

Adaptive Plug-andPlay Components for Evolutionary Software Development, Mira Mezini et al, ACM, 1998, pp. 97-116.*
Wide Workflow Development Methodology, L. Baresi et al, ACM, Mar. 1999, pp. 19-28.*
BizTalk Server 2000 Developer's Guide for .NET., Robert Shimonski et al, Jan. 1, 2002, pp. 124-127, 182,205,218,229-230,276-283.*
Building Workflow Business Objects, Marc-Thomas Schmidt, 1998, 10 pages.*
"Integrating WebShere Commerce with SAP R/3", Tamas Vilaghy et al, IBM Redbooks, Dec. 24, 2003, Whole Book.*
"The AT&T Rhapsody Business Orchestration Solution", AT&T Technology, US vol. 5, No. 3, Jan. 1990, pp. 2-9.*
AIMS: Robustness Through Sensible Introspection, pp. 153-156, Sep. 2002.*
Non-Intrusive Object Introspection in C++ Architecture and Application, Tyng-Ruey Chaung et al., IEEE, 1996, pp. 312-321.*
Dynamic Coordination Architecture through the use of Reflection, Carlos E. Cuesta et al, ACM, 2001, pp. 134-140.*

(Continued)

*Primary Examiner*—Wei Y Zhen
*Assistant Examiner*—Qamrun Nahar
(74) *Attorney, Agent, or Firm*—Marshall, Gerstein & Borun LLP

(57) ABSTRACT

A method for enabling an existing business workflow tool to extend application functionality through the use of external components and for providing a business abstraction layer that lowers a user design barrier.

20 Claims, 12 Drawing Sheets

OTHER PUBLICATIONS

Creating a Knowledge Management Architecture for Business Process Change, Jurgen Vanhoenacker et al, ACM, 1999, pp. 231-241.*

WebSphere Commerce v5.4 Developers's Handbook, IBM Redbooks, Bil Moore et al, Dec. 2002, Whole Manual.*

* cited by examiner

```xml
<workflow.config xmlns="http://microsoft.com/mscrm/workflow/" >
  <methods>
    ...
    <method name="CreateAccount" assembly="Microsoft.Crm.Platform.WorkflowTestAssembly.dll" typename="ObjectCreator"
      methodname="CreateAccount" group="Objects Methods">
        <parameter name="Caller" datatype="caller"/>
        <parameter name="Name" datatype="string"/>
        <parameter name="Account Number" datatype="string"/>
        <parameter name="Description" datatype="string" default=""/>
        <result datatype="lookup" objecttype="1"/>
    </method>
    <method name="Retrieve Account" assembly="Microsoft.Crm.Platform.WorkflowTestAssembly.dll" typename="ObjectCreator"
      methodname="RetrieveAccount" group="Objects Methods">
        <parameter name="Caller" datatype="caller"/>
        <parameter name="Id" datatype="lookup" objecttype="1"/>
        <result datatype="xml">
            <retval name="Id" xpath="//account/accountid/text()" datatype="lookup" objecttype="1" />
            <retval name="Name" xpath="//account/name/text()" datatype="string" />
            <retval name="Account Number" xpath="//account/accountnumber/text()" datatype="string"/>
            <retval name="Description" xpath="//account/description/text()" datatype="string"/>
        </result>
    </method>
    <method name="Update Account" assembly="Microsoft.Crm.Platform.WorkflowTestAssembly.dll" typename="ObjectCreator"
      methodname="UpdateAccount" group="Objects Methods">
        <parameter name="Caller" datatype="caller"/>
        <parameter name="Id" datatype="lookup" objecttype="1"/>
        <parameter name="Name" datatype="string" default=""/>
        <parameter name="Account Number" datatype="string" default=""/>
        <parameter name="Description" datatype="string" default=""/>
    </method>
    ...
  </methods>
</workflow.config>
```

*Figure 6*

EXTENSIBILITY FRAMEWORK FOR DEVELOPING FRONT OFFICE (CRM) WORKFLOW AUTOMATION COMPONENTS

FIELD OF THE INVENTION

The present invention generally relates to a framework for enabling an existing business workflow tool to extend application functionality through the use of external components and for providing a business abstraction layer that lowers the user design barrier.

BACKGROUND

Existing customer relationship management (CRM) systems may be ill-equipped to model and automate front office business processes because they are primarily designed to capture and manage customer related task data, not perform workflow modeling. Front office processes may require cross-platform functionality that CRM systems cannot handle. Lead assignment and routing, for example, involves customer information requests that originate in a CRM system, but require additional functionality to route the lead information to the appropriate office and sales team. Existing systems rely on integration applications to enable cross-platform function building.

The problem with using integration applications is that using them is expensive. While integration applications are robust, they are tailored for integration technology ("IT") specialists who are involved in the detailed bridging of disparate systems. These integration applications provide a full array of tools for creating workflow definitions and implementing user-designed workflow processes. However, these applications may be overkill for simple functional extensions of CRM based tasks. In the example of lead assignment and routing above, using an integration application to create a custom solution would require the expensive time of a skilled IT professional. Moreover, integration applications are suited to handle large system integration problems, specifically vertical integration solutions that connect disparate and complex systems along a supply chain. Often times, all that is needed in a CRM application is a simple fix that is within the ability of an average business process developer to define, and which is based on extending the functionality of CRM based tasks.

Some CRM workflow systems, such as Microsoft CRM, provide ancillary workflow tools that include some customization capabilities. However, the functionality is usually limited to what is included out-the-box and is not extensible. This severely limits a business developer's ability to implement a custom solution. Furthermore, to enable an average business developer to implement extensions, a framework must be devised that provides a library of functions, and the functions should be exposed to the user in a business friendly manner. As noted above, design time components are limiting and, thus, the framework should also allow third party independent service providers ("ISV") the ability to offer components for extending CRM functions. Unfortunately, ISVs are currently not incentivized to provide these components because existing CRM systems require components to implement or inherit CRM object types, which makes the components harder to design and system specific, i.e., inextensible. Moreover, the industry trend is to simply involve IT technicians in producing a solution, even though small businesses do not require a full scale integration effort.

Therefore, there is a need to develop an extensible framework that 1) enables an average business developer to assemble extensions for CRM application functions; 2) enables a CRM system to use a library of components external to its application platform and 3) incentivizes ISVs to develop extension components.

BRIEF DESCRIPTION OF THE DRAWINGS

FIG. 6 illustrates an example of a configuration file for an embodiment of the pending claims.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
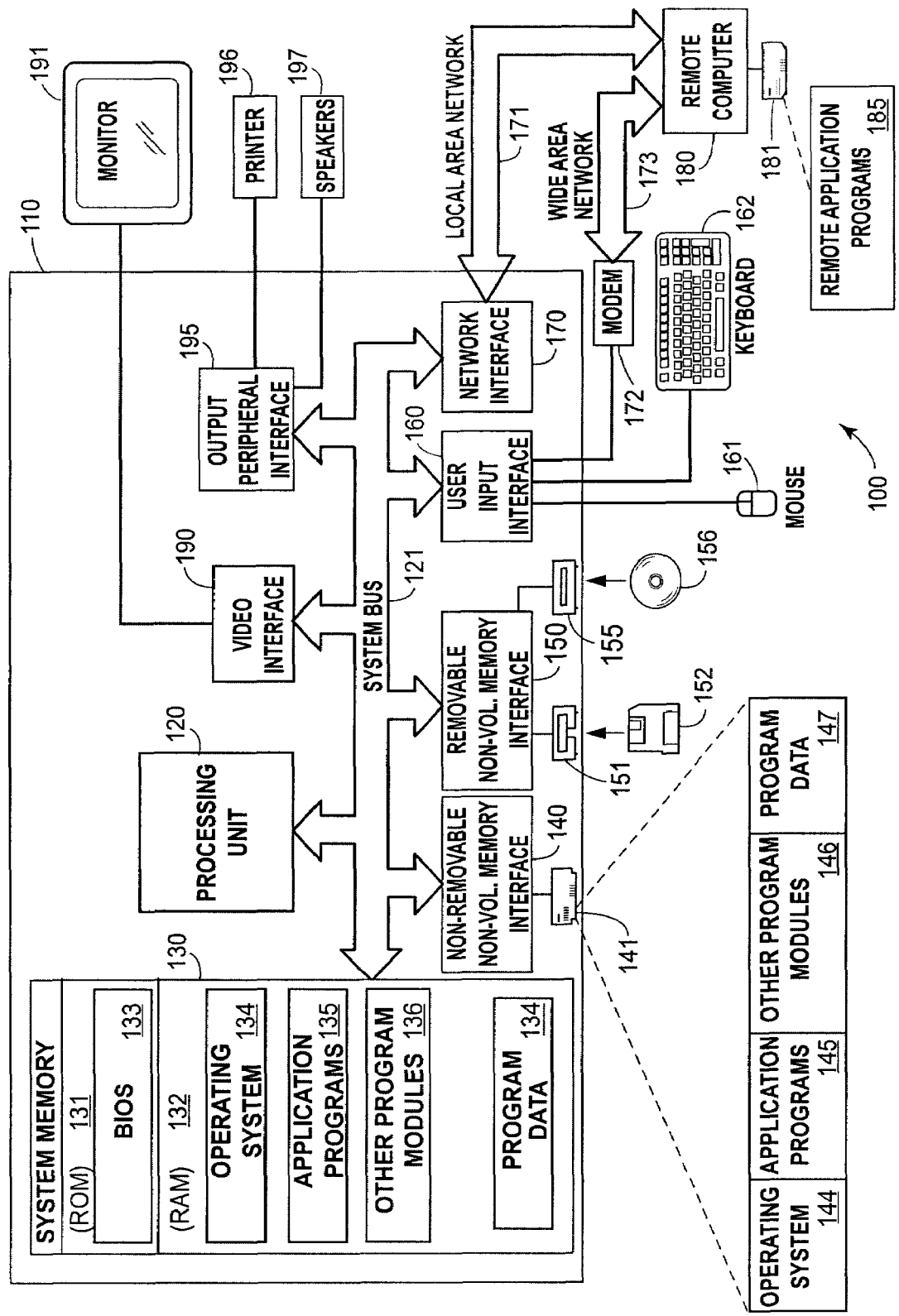
FIG. 1 illustrates a block diagram of a computing system that may operate in accordance with the claims.

FIG. 1 illustrates an example of a suitable computing system environment 100 on which a system of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
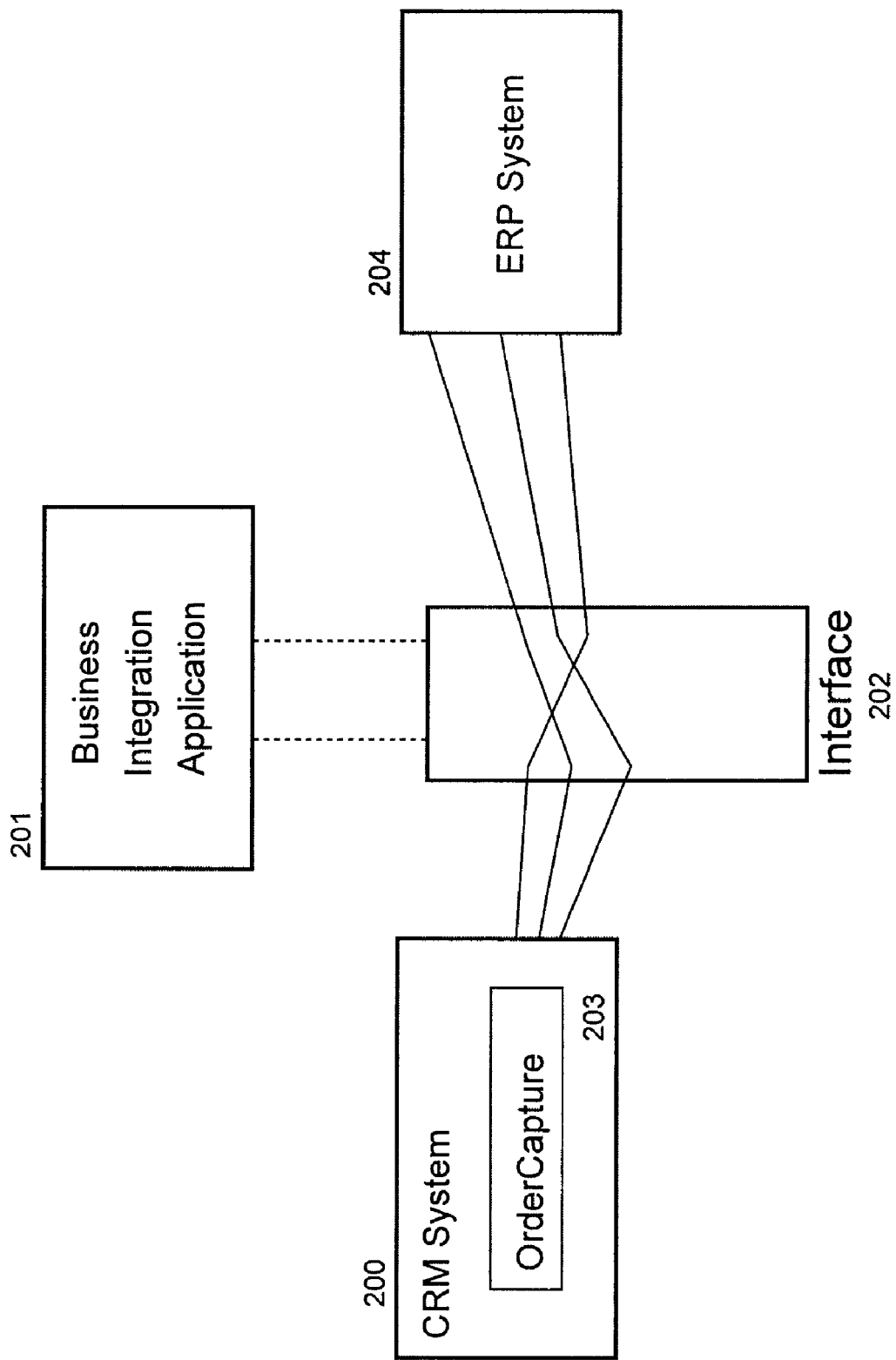
FIG. 2 illustrates an existing integration model.

FIG. 2 illustrates a third party application integrated with a CRM system 200 through the use of a business integration application 201, such as Microsoft BizTalk. In this situation, an integration application will provide an interface 202 that may map parameters of a CRM function 203 to a third party component 204 so that the components may communicate with one another. In this model, in order to extend a CRM application, one may actually need to expose the CRM's objects in order to communicate with external components. Often times, CRM systems may only allow components that implement CRM object types. This may make components difficult to integrate, even with robust integration tools. This complex mapping process may not be suited for an average business developer who is only interested in defining an extension of a CRM task.

Figure 3:
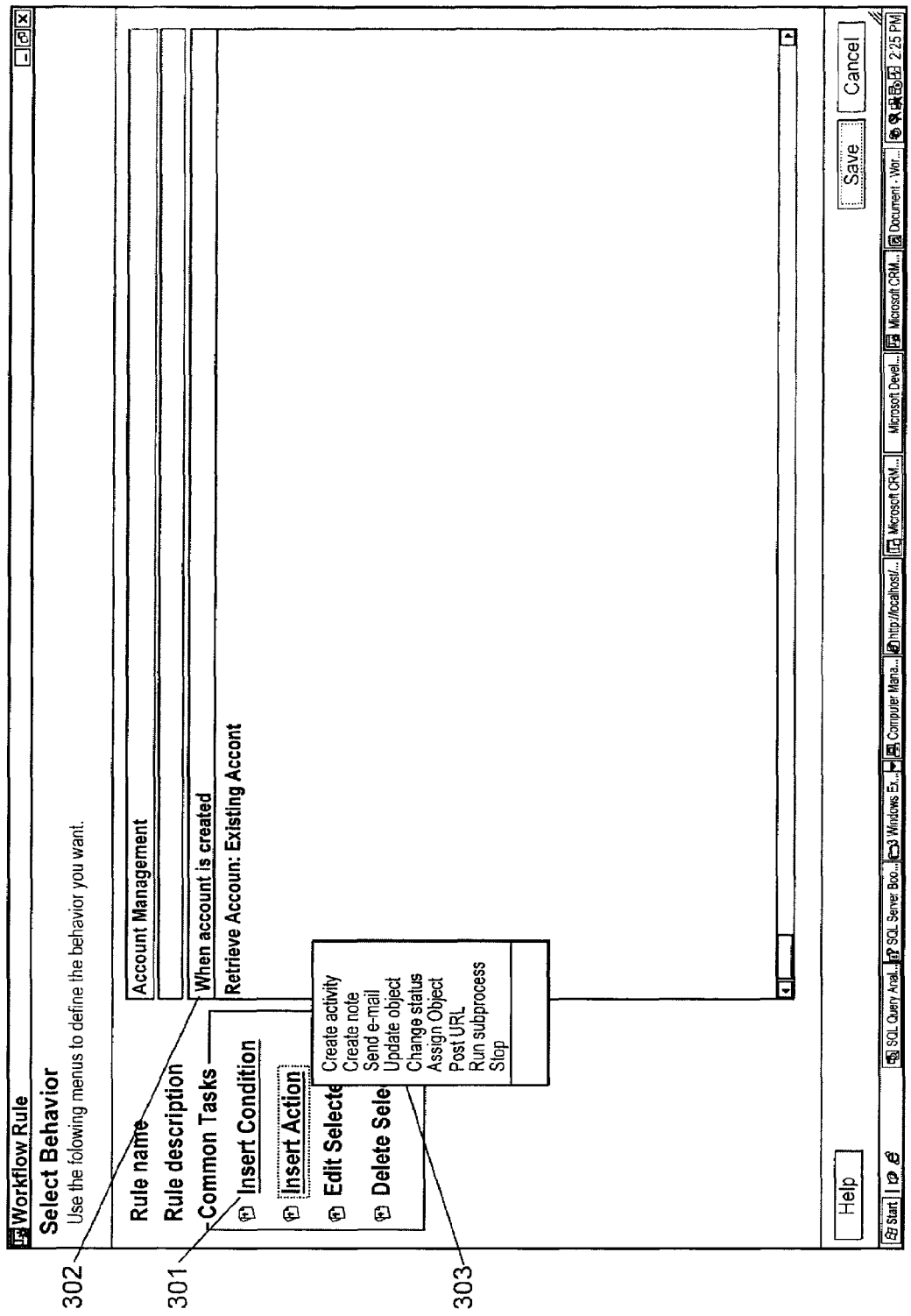
FIG. 3 illustrates an existing CRM system having an ancillary workflow tool.

FIG. 3 illustrates a screenshot of an existing ancillary workflow tool 300 of a CRM system. An example of such an ancillary workflow tool is Microsoft CRM Workflow. Tools such as Microsoft Workflow may provide a workflow definition editor and workflow engine. The workflow tool may provide a list of available triggering conditions 301 based on a CRM function. It should be noted that because CRM functionality is modeled around tasks, most of the business functionality being extended in a CRM system may be task related. In FIG. 3, task triggers may include the event of opening or creating a new account 302. FIG. 3 further illustrates a list of actions 303 that may be executed based on the condition. As discussed above, the problem with existing systems is that the list of possible actions 303 may be limited to those supplied out-the-box. No existing extensibility framework allows non-developers to enhance this list after design time. Moreover, even if external components could be enabled, existing systems do not provide the ability to tailor the exposure of component functionality to conform with the existing schema of a workflow application design environment.

Figure 4:
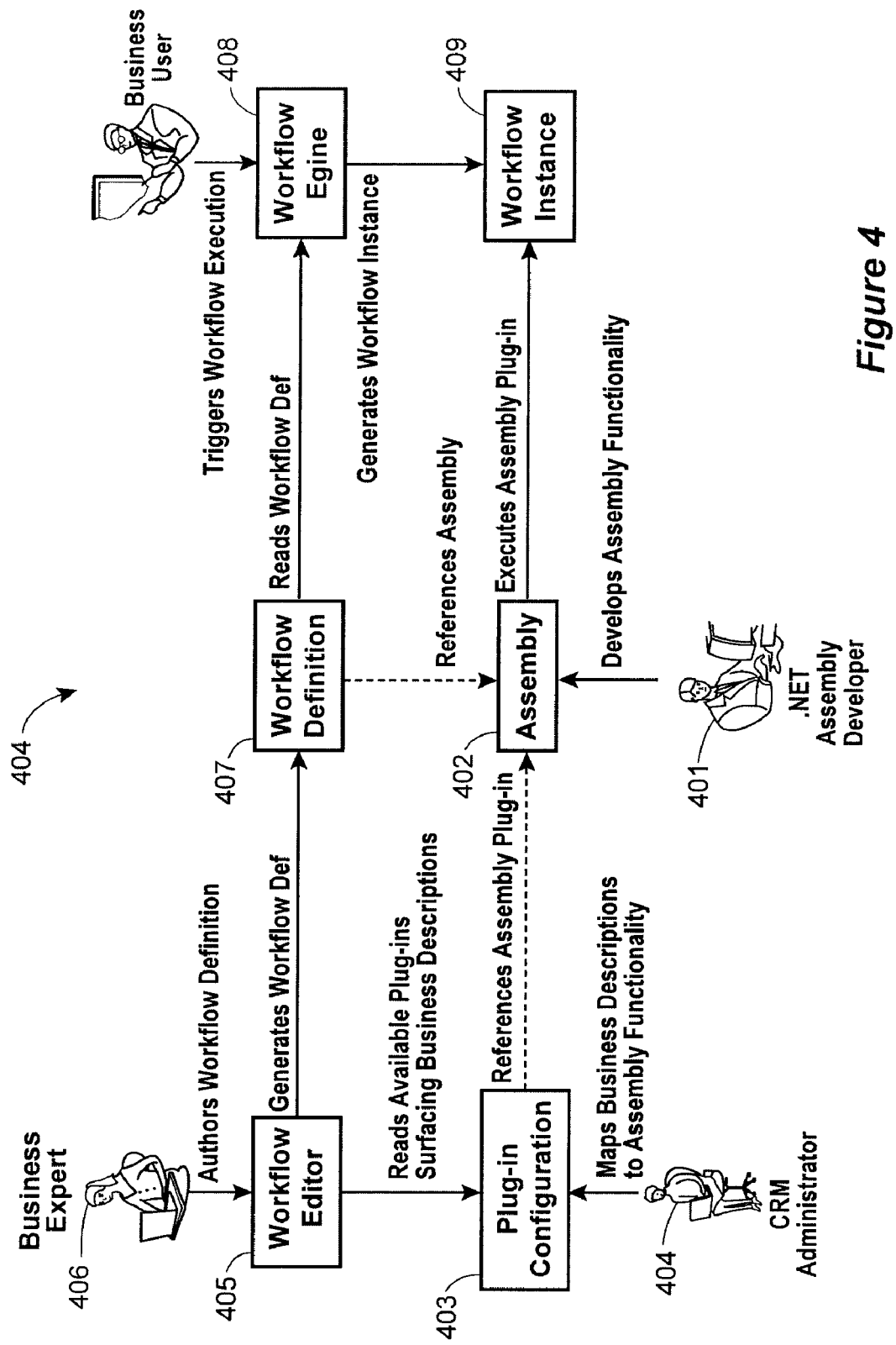
FIG. 4 illustrates an embodiment of the pending claims.

FIG. 4 illustrates an embodiment of the system in accordance with the pending claims. In system 400, an assembly developer 401 may create a plug-in component for extending a CRM system. Each plug-in component may utilize primitive data types or CRM object types. As mentioned above, existing systems may mandate the use of CRM object types which severely limit the incentives for ISVs to produce components. While primitive data types still restrict ISV design, they may be much less inhibitive. Moreover, primitive data types are universal in the sense that most complex data types may be decomposed into a set of primitive data types and primitive data types may be passed between assembly components with less complication. Therefore, the component specifications may simply require passing primitive data types. However, while using primitive data types may provide extensibility to external objects, it should be noted that objects that embed or pass a CRM system's objects may enable the CRM system to provide richer content because the CRM system is accustomed to its own objects.

The system 400 may require that the components be placed into an assembly 402 and registered via a configuration object 403. The assembly may comprise a dynamic link library, or .dll file, which may be a library of functions and components that can be accessed by a Microsoft Windows program. The configuration object may include at least the location of the assembly (including any necessary instantiation information) as well as a listing of the parameters of the component. The assembly may be located in a number of locations depending on the application setup, and this may include a global assembly cache. Business-friendly descriptions may be created and mapped to the parameters in the configuration object (these parameters may include method names). The mapping may be done by a CRM administrator 404. The business-friendly descriptions may be based on studies of easy to use language. The friendly descriptions and parameters may be mapped by a business developer, or may even be provided initially by the ISV.

A workflow editor 405 may be configured to access the configuration file and extract the mappings and instantiation information. The workflow editor, using the configuration file and assembly framework of the pending claims, may now display to a business developer 406, a user friendly interface consisting of convenient groupings and friendly descriptions of extension options. A user may then select and assemble a business description model, while a workflow definition 407 constructs actual method calls, based on the description model, using actual parameter identifiers obtained from the configuration object 403.

The configuration object 403 may contain information on every plug-in assembly object that is available to the CRM workflow application. In this manner, the configuration object 403 may act as a registration tool. In addition to the registration information of the configuration object 403, and in accordance with an aspect of the method and system of the claims, the configuration object may contain a mapping of actual parameters of the plug-in configuration object to business friendly descriptions of the parameters. The workflow editor 405 may display the assembly functions in a modeling environment using the business friendly descriptions. These business friendly descriptions may form an abstraction layer between the technical implementation of the components and the user level modeling of a workflow definition. The mappings may also provide information for configuring each plug-in assembly to conform with the style of the editor. For example, the functionality exposed via the mapping may use naming conventions that conform to the existing design convention. Thus, for a component that provides the function of retrieving a company's credit rating, the method may be exposed as "Retrieve Company Credit Rating" instead of a restricted, code-based schema name, such as "getCCR." In this manner, the actual technical implementation is hidden from the user.

FIG. 4 illustrates that once a workflow definition 407 is created, it may be executed by a workflow engine 408, which creates an instance of the component 409, during the course of normal operation. The workflow engine 408 may be configured to locate and instantiate the plug-in assembly objects using a link contained in the configuration object.

Figure 5:
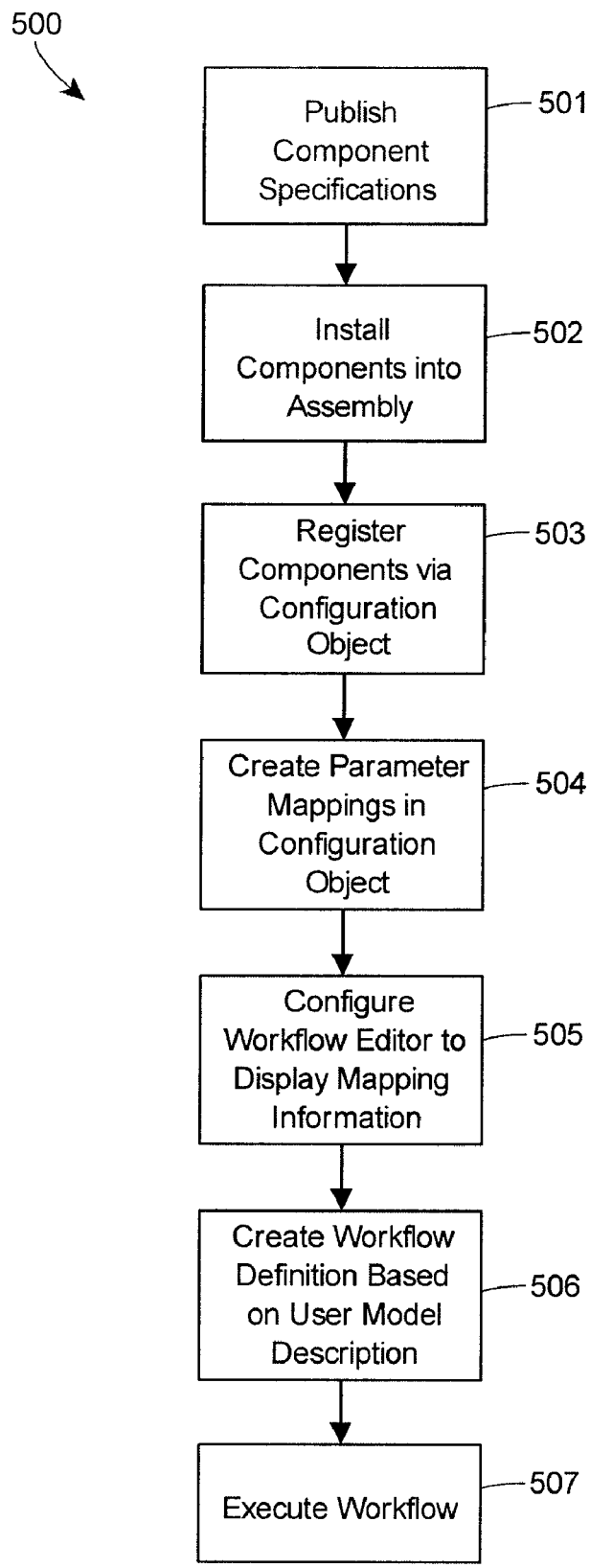
FIG. 5 illustrates a general flow chart for a method of the pending claims.

FIG. 5 illustrates a summary flow chart of a method of the pending claims. ISVs may be given a component specification 501 that provides them enough design leeway and incentive to create components. Externally created components may then be placed into an assembly 502. The components may be registered with a configuration object 503. The configuration object may be modified to include business-friendly mappings 504 that support the abstraction layer of the system. A workflow editor may be configured to access the configuration object 505 and display the abstraction layer as a user-friendly design environment. The environment may be based on the mappings contained in the configuration file. As the user assembles the required workflow model definition, the editor may use the mappings to create an actual definition 506. The workflow definition may then be executed 507.

The embodiments of FIGS. 4 and 5 illustrate that the modification to the workflow system may be isolated to the workflow editor 402. The workflow definition, once it is created, may be completely independent, and may include all the actual method parameter identifiers and instantiation information. However, alternative embodiments may place a translation step anywhere between the workflow editor 405 and the workflow engine 408. For example, the workflow definition may involve business-friendly descriptions that require a translation during execution time in which case the engine may reference the configuration file to translate the business friendly descriptions into actual parameter identifiers. Alternatively, the workflow definition may be created to contain the mappings of the configuration object. In this manner, the workflow definition may be executed without reference to the configuration object, or the workflow definition may be transferred to another application for editing, using the business friendly descriptions contained in the workflow definition.

FIG. 6 illustrates an example of a configuration object, in the form of a configuration file, for one embodiment of the pending claims. As shown in FIG. 6, the configuration file 600 may contain the name of an assembly 601, location of the assembly 602, class type 603, method name 604, method friendly name 605, group 606, friendly input parameter names 607 (the order of the parameters correspond to the actual parameter mappings), and friendly result parameter names 608. While this embodiment shows a configuration file embodiment, the configuration object may take any form, including an object class definition, a database table, etc.

Figure 7A:
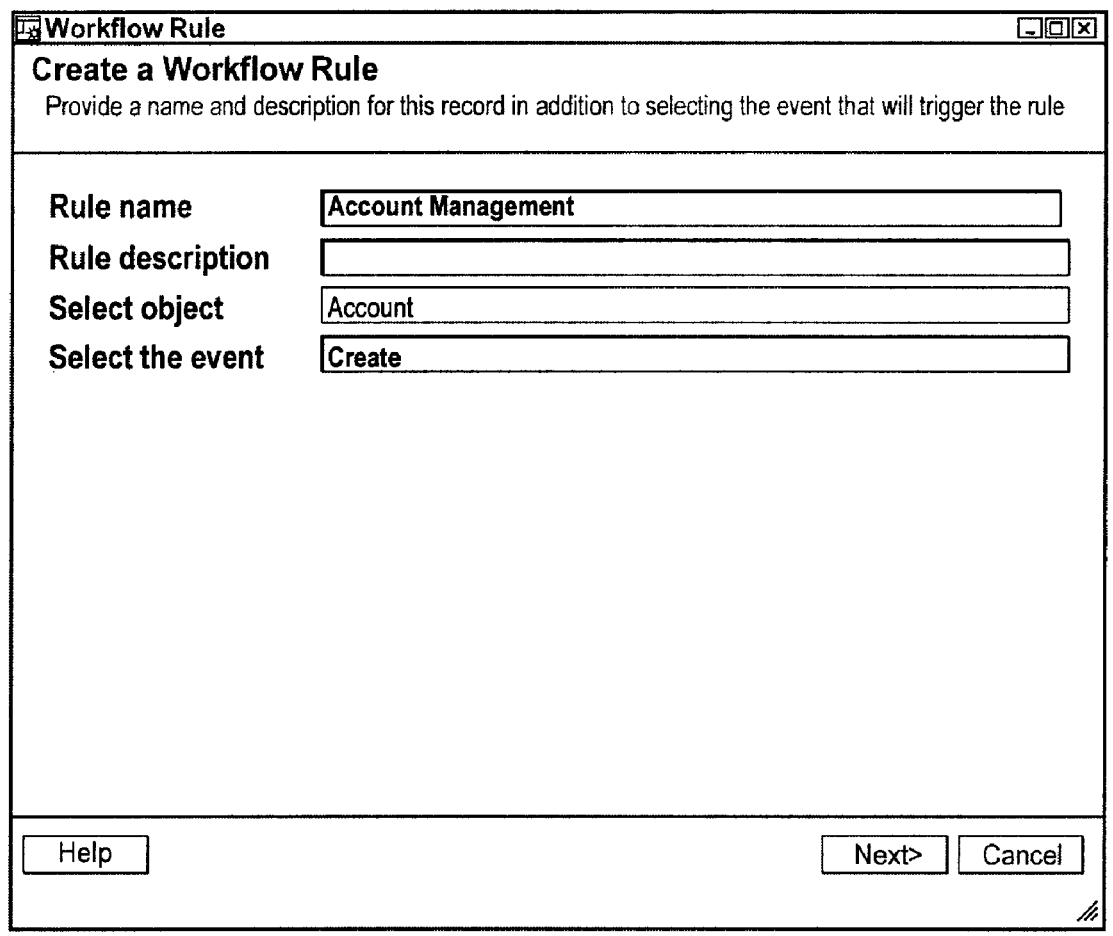
FIGS. 7a-7f illustrate screen shots of the extension design process for an embodiment of the pending claims.
Figure 7B:
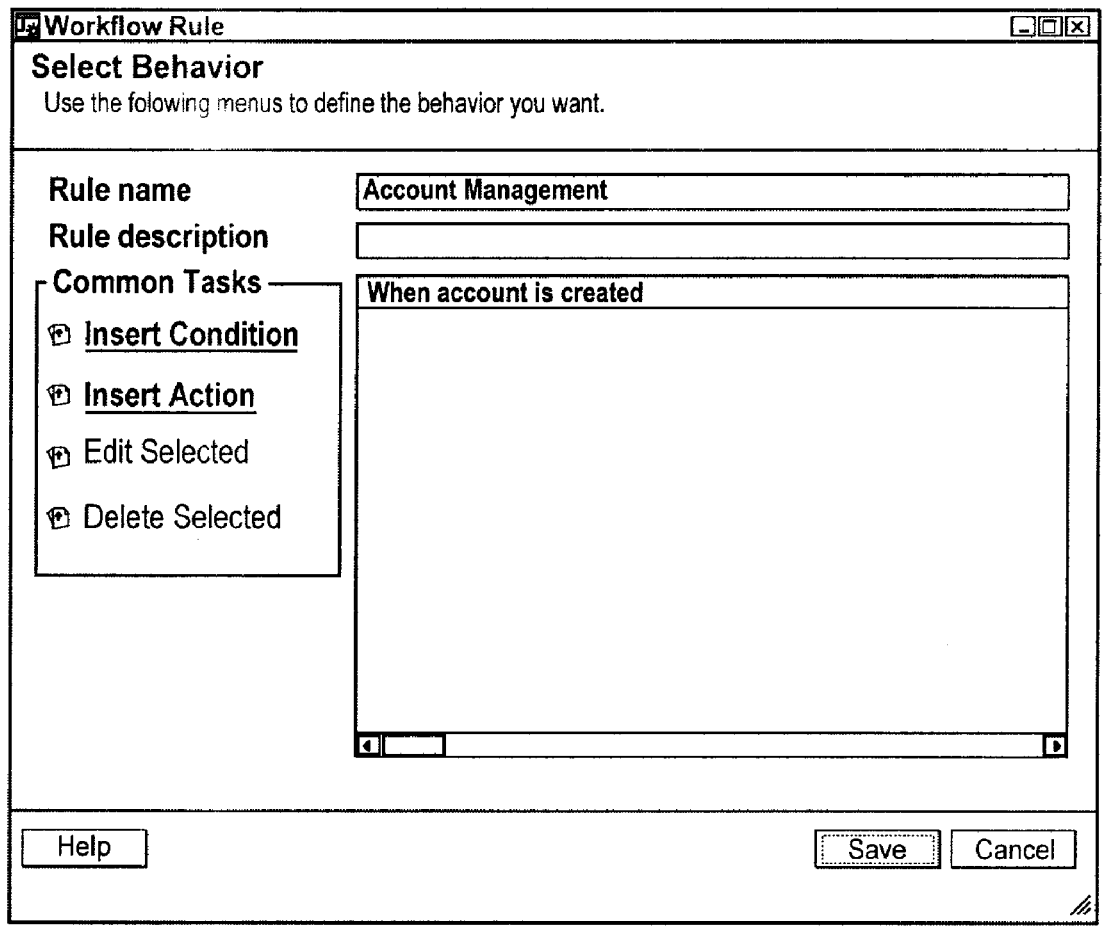
Figure 7C:
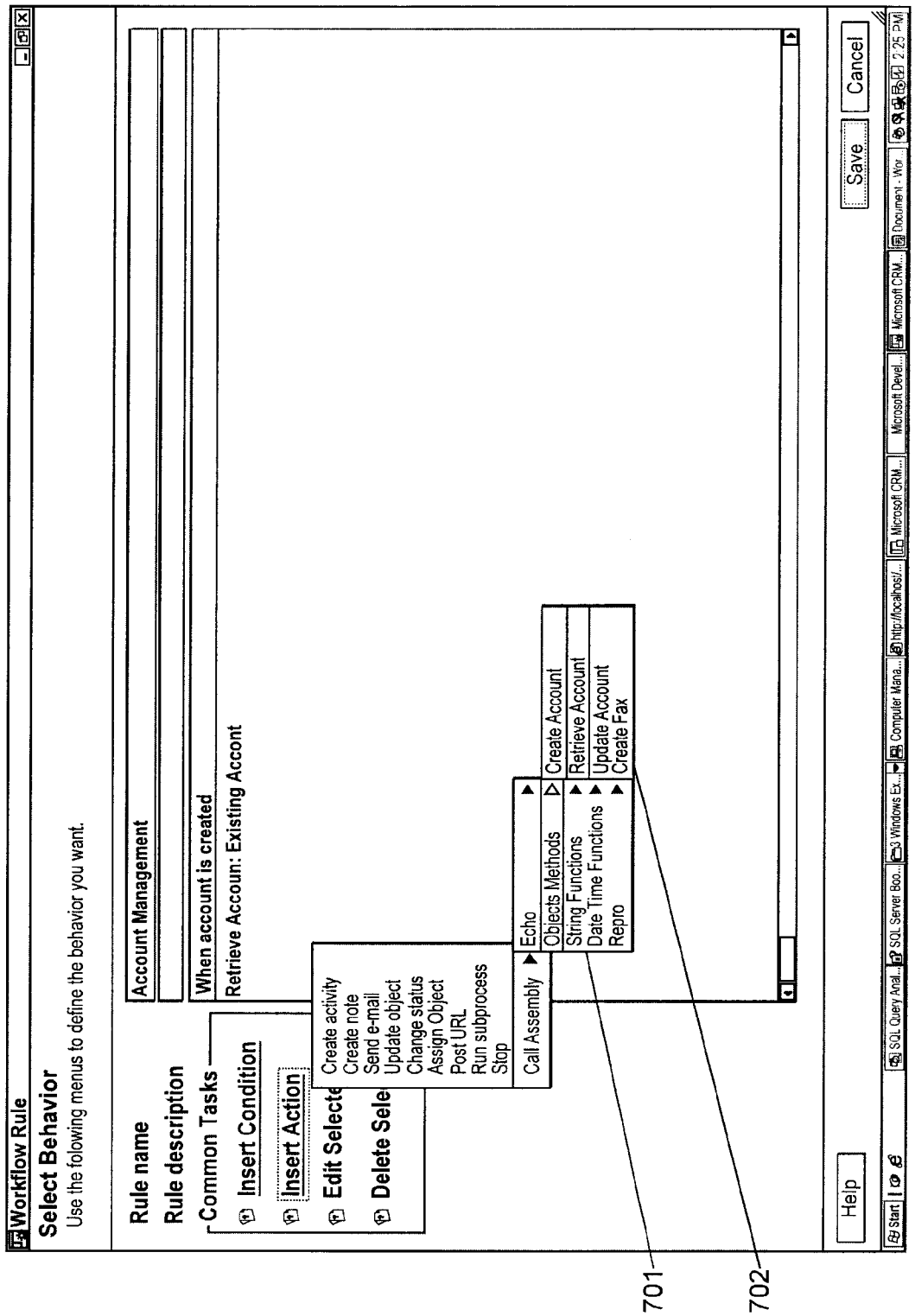

FIGS. 7a-7f illustrate screen shots of a CRM workflow editor that illustrate an embodiment of the pending claims. This embodiment may utilize the configuration file of FIG. 4. FIG. 7a illustrates the first screen of a rule definition wizard. A rule named "Account Management" may be inputted and the option to create a rule may be selected. FIG. 7b illustrates that the first part of the rule definition is a condition of "When account is created." FIG. 7c illustrates action options that may be attached to the condition. Unlike the prior system of FIG. 3, FIG. 7c illustrates a "Call Assembly" option for utilizing external components. As illustrated in FIG. 7c, assembly object functions may be grouped, or clustered, into logical categories 701 which may then be selected to expose action options 702 for inclusion into a business rule. In this case, the method "Retrieve Account" is chosen. It should be noted that the configuration file may provide the business-friendly names to display in the tree menus and moreover, the groupings may be based on the configuration object. Also, the configuration object may provide default parameter values used to ensure proper method calling. For example, a CRM system using a function provided by an external component may not use a particular function parameter. In this case, the configuration object may be used to further establish compatibility with an external component that may require some value for the parameter. In a further embodiment, the configuration object may not only register each plug-in component, but also may provide masking, or hiding, capabilities for selectively exposing component methods. For example, an embodiment may involve hiding certain methods or parameters based on style considerations and/or security factors (e.g., role based security).

Figure 7D:
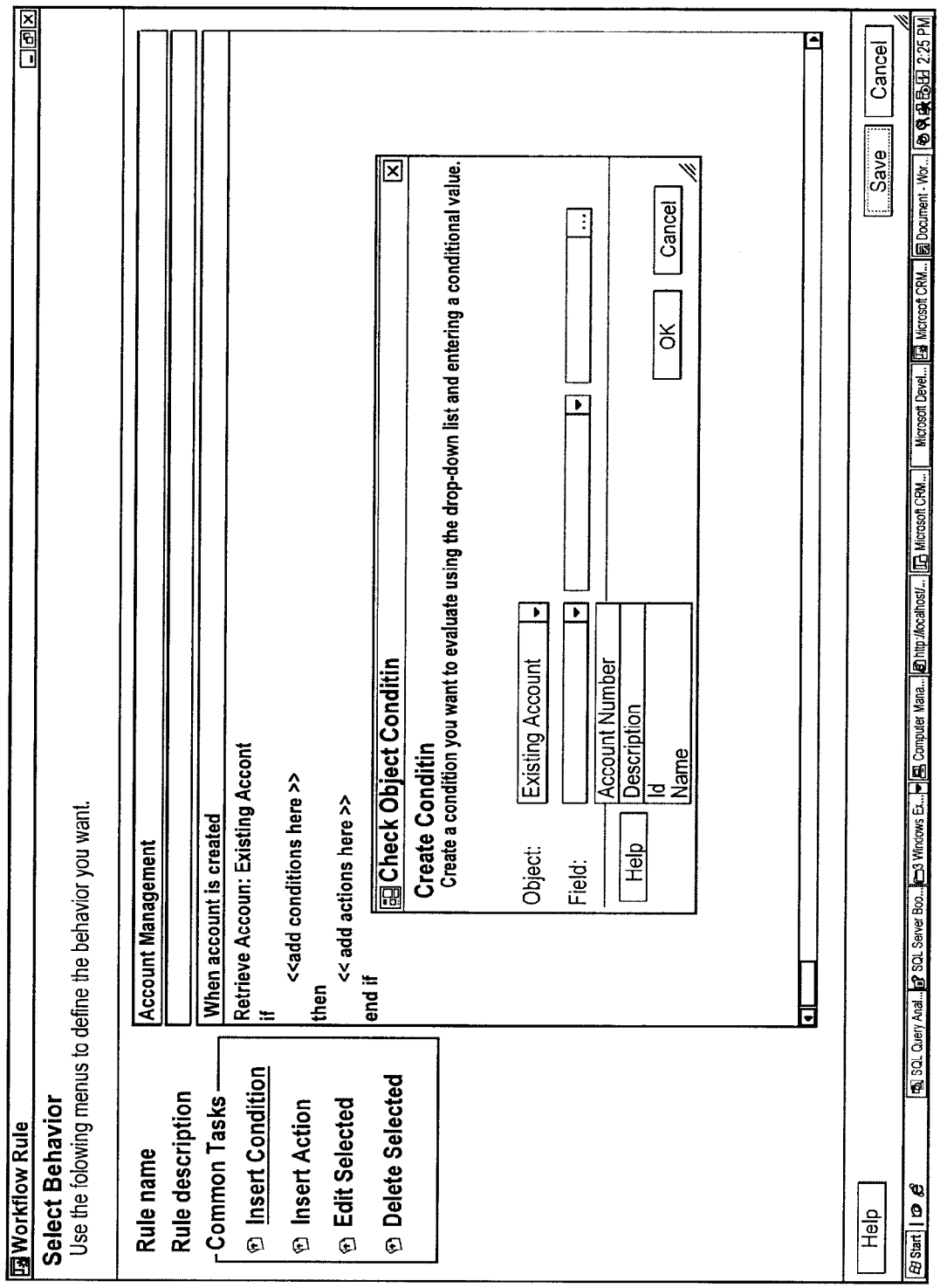
Figure 7E:
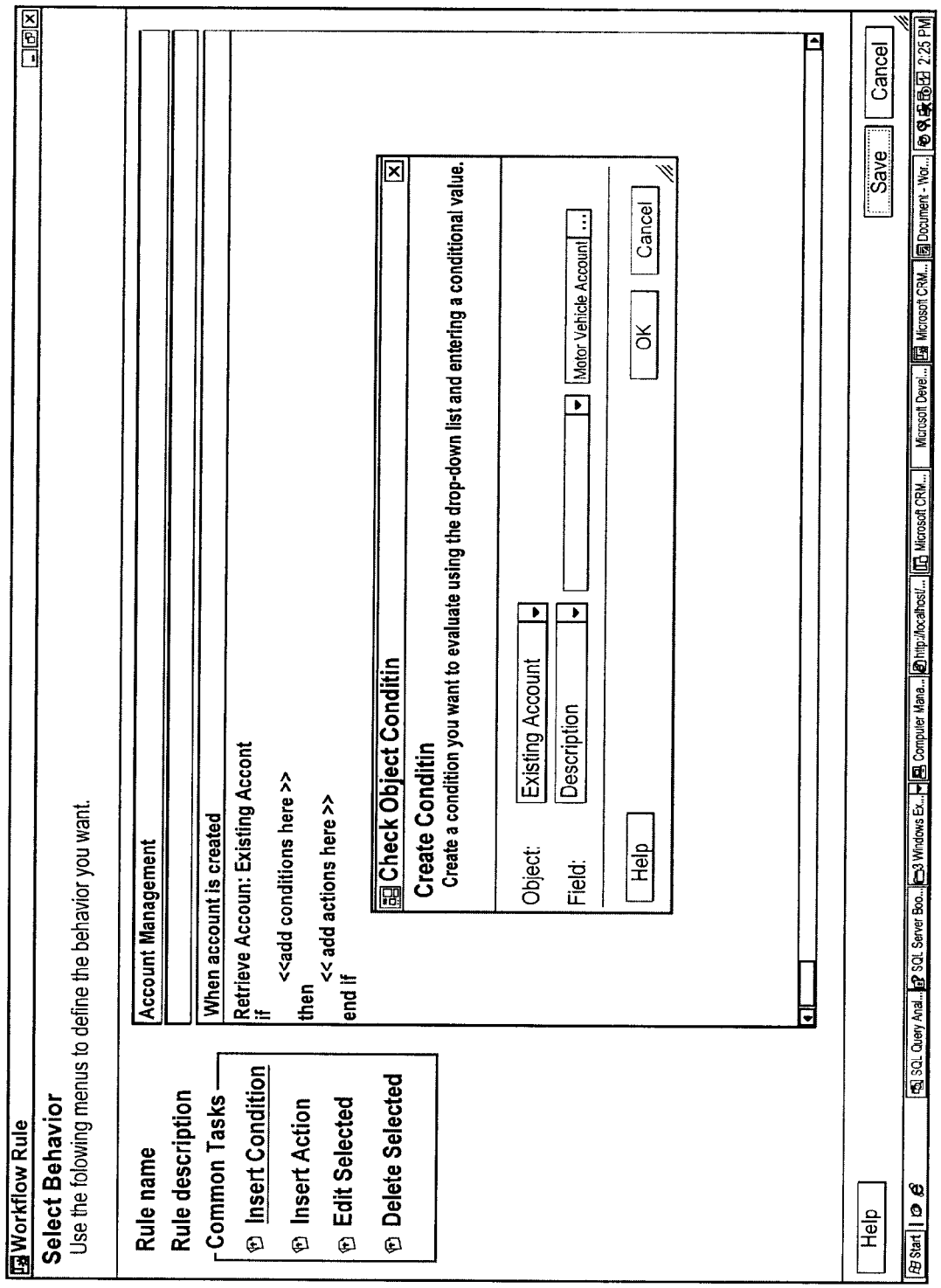
Figure 7F:
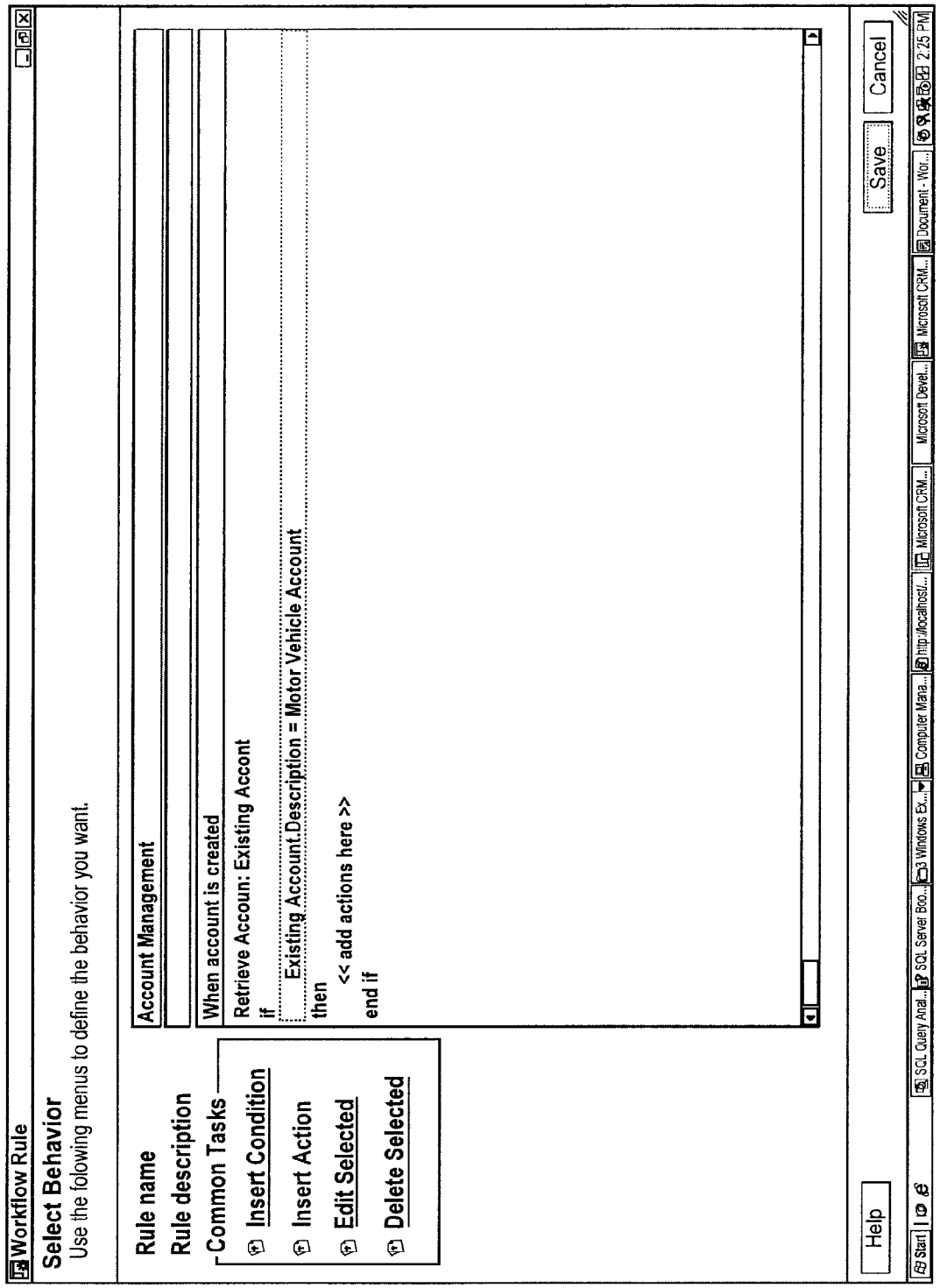

FIGS. 7d-7f illustrate the rest of the rule generation process in which a parameter of the method of Retrieve Account is chosen (FIG. 7d), the parameter is given a condition (FIG. 7e), and the rule is finalized (FIG. 7f).

A further embodiment of the claims may provide the option for users of the workflow editor application to modify the business friendly description in the configuration file, thereby enabling them to change the displayed schema and customize the design environment according to their tastes. The workflow editor may provide a convenient and familiar user-interface that comports with its workflow design environment, making it even easier for the user to manage extensions.

The method and apparatus of the pending claims may provide a means for third party ISVs to develop components that extend the functionality of a CRM application while being independent of the CRM application. These components are therefore extensible. Further, using the configuration object of the pending claims provides an abstraction layer that may enable average business developers to customize their own front office solutions with less dependence on an IT professional or integration application. Moreover, business developers may customize their design environment to suit their needs by modifying the configuration file.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments may be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-implemented method of enabling a business end user to import external assembly components into a runtime environment of a customer relationship management (CRM) application for executing a workflow definition that incorporates functions of the external assembly object, comprising:

importing a plug-in assembly object for instantiation during execution of a workflow definition of the customer relationship management system, wherein the plug-in assembly object includes a set of methods and at least one method of the set of methods accepts and returns a set of primitive data types instead of an object of the customer relationship management system;

creating a configuration object comprising a link to the plug-in assembly object and a mapping of a parameter of the plug-in assembly object to a a translated description of the parameter of the plug-in assembly object;

accessing the configuration object to display the translated description of the parameter of the plug-in assembly object;

executing a workflow definition by the customer relationship management application, wherein the workflow definition calls the assembly object method, thereby instantiating the plug-in assembly object, using the link of the configuration object.

2. The method of claim 1, further comprising executing the workflow definition.

3. A customer relationship management system comprising:

a display unit;

an input device;

a processing apparatus operatively coupled to said display unit and said input device, said processing apparatus comprising a processor and a memory operatively coupled to said processor, said processing apparatus being programmed to:

execute a customer relationship management application;

import a plug-in assembly object for instantiation during execution of a workflow definition of the customer relationship management application, wherein the plug-in assembly object includes a set of methods and at least one method of the set of methods accepts and returns a set of primitive data types instead of an object of the customer relationship application;

create a configuration object that includes a link to the plug-in assembly object and a mapping of a parameter of the plug-in assembly object to a translation parameter containing a value corresponding to a translated description of the parameter of the plug-in assembly object;

accessing the configuration file to display the the translated description of the parameter of the plug-in assembly object;

executing a workflow definition by the customer relationship management application, wherein the work flow definition calls the assembly object method, thereby instantiating the plug-in assembly object, using the link of the configuration object.

4. The system of claim 3, further comprising a workflow engine that executes the workflow definition by instantiating the assembly object using the link contained in the configuration object, and calling the method of the assembly object using the parameter.

5. The system of claim 3, wherein the workflow editor is used to modify the business-friendly description.

6. The system of claim 3, wherein the configuration object comprises:

a name of an assembly;

an assembly location;

a class type;

a method name;

a method friendly name;

a set of variable friendly names;

a result type; and a group.

7. The apparatus of claim 6, wherein the name of the assembly comprises a .dll name.

8. The apparatus of claim 6, wherein the assembly location comprises a global assembly cache.

9. The apparatus of claim 6, wherein the variable friendly names are business names for a set of required parameters used by the method.

10. The apparatus of claim 6, wherein the result type comprises a primitive type being returned by an assembly method call.

11. The apparatus of claim 6, wherein the result type comprises an object of the customer relationship management application.

12. The apparatus of claim 6, wherein the group is a label used to group the method by functionality.

13. The apparatus of claim 6, wherein the configuration object is a configuration file.

14. A computing apparatus, comprising:

a display unit that is capable of generating video images;

an input device;

a processing apparatus operatively coupled to said display unit and said input device, said processing apparatus comprising a processor and a memory operatively coupled to said processor; and a network interface connected to a network and to the processing apparatus; said processing apparatus being programmed to:

import a plug-in assembly object for instantiation during execution of a workflow definition of the customer relationship management system, wherein the plug-in assembly object includes a set of methods and at least one method of the set of methods accepts and returns a set of primitive data types instead of an object of the customer relationship management system;

create a configuration object comprising a link to the plug-in assembly object and a mapping of a parameter of the plug-in assembly object to a translated description of the parameter of the plug-in assembly object;

access the configuration object to display the translated description of the parameter of the plug-in assembly object; and execute a workflow definition by the customer relationship management application, wherein the workflow definition calls the assembly object method, thereby instantiating the plug-in assembly object, using the link of the configuration object.

15. The apparatus of claim 14, wherein said processing apparatus is further programmed to execute the workflow rule by instantiating the assembly object using the link contained in the configuration object, and calling the method of the assembly object using the parameter.

16. The apparatus of claim 15, wherein the configuration object is a configuration file.

17. The apparatus of claim 15, wherein the link comprises a file path to the assembly object.

18. The apparatus of claim 15, wherein the business-friendly description is updated using the workflow editor.

19. The apparatus of claim 15, wherein the parameter of the assembly object comprises at least one of a name of an assembly, a class type, a method name, a method parameter, and a group.

20. The apparatus of claim 15, wherein the configuration object comprises a plurality of mappings of actual method parameters and business-friendly descriptions, and further wherein a mapping is included in configuration object based on security factors.

* * * * *